Figures 1, 2, 3:
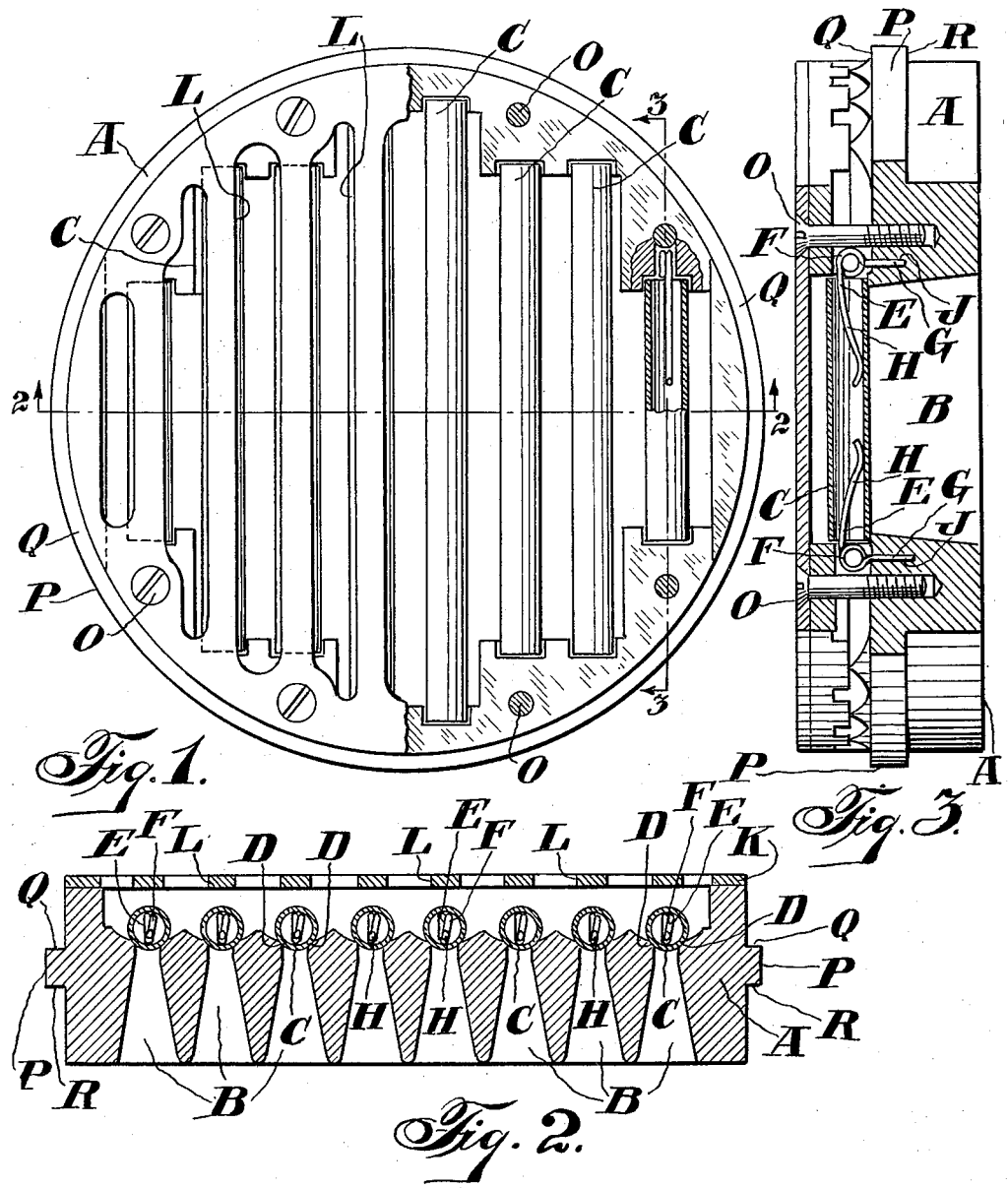

March 18, 1930. A. J. BRIGGS 1,751,230
COMPRESSOR VALVE
Filed Jan. 21, 1928

INVENTOR.
Arthur J. Briggs.
BY Herbert V. Ogden
HIS ATTORNEY.

Patented Mar. 18, 1930

1,751,230

UNITED STATES PATENT OFFICE

ARTHUR J. BRIGGS, OF SYRACUSE, NEW YORK, ASSIGNOR TO INGERSOLL-RAND COMPANY, OF JERSEY CITY, NEW JERSEY, A CORPORATION OF NEW JERSEY

COMPRESSOR VALVE

Application filed January 21, 1928. Serial No. 248,420.

This invention relates to valves and more particularly to valves used in the compressing cylinders of air, gas and ammonia compressors.

The objects of this invention are to provide a simple and economical construction for valves of the type mentioned. Another object is to permit the use of the valve for either inlet or discharge by reversing its position. Other objects are to overcome fluttering and noise, and to provide a large port area. Other objects will be in part obvious and in part pointed out hereinafter in the specification and shown in the drawings in which, Figure 1 is a plan view of the valve partly in section, Figure 2 is a sectional elevation taken on the line 2—2 looking in the direction indicated by the arrows, and Figure 3 is a sectional elevation taken on the line 3—3 looking in the direction indicated by the arrows.

Referring more particularly to the drawings A is a valve seat to be secured in the compression cylinder of a compressor (not shown). In the valve seat A are formed the transverse port openings B through which the air or other gas being compressed may pass. The port openings B are normally closed by the valve tubes C which seat on the upper edges D of the port openings, the edges D being machined to cooperate with the outer cylindrical surfaces of the valve tubes C thereby providing an airtight fit when the valves are seated. The tubes C are preferably sections of seamless steel tubing and are easily and cheaply replaced if broken or damaged in any way.

Springs E having a coiled portion F, is straight end G and a curved end H hold the valve tubes C on the seats D and prevent fluttering or vibration of the valves. In order to secure the valve tubes C by means of the springs E, holes J are drilled in the valve seat and the pin ends G of the springs E are driven into these holes after the ends H have been inserted in the valve tubes C. A continuous pressure is exerted by the spring ends H upon the valve tubes thus tending to hold them seated. A cover plate K having slots L parallel to the valve tubes C and port openings B is secured to the valve seat A by means of countersunk cap screws O. The cover plate K, while permitting the free passage of air, limits the movement of the valve tubes C when lifted by air pressure at the ports B thereby preventing dangerous velocity and impact of the valve tube on its seat.

The valve may be used either as in inlet or discharge valve and to this end a bead P is formed on the valve seat A thus providing a shoulder Q and a similar oppositely disposed shoulder R to cooperate with the edge of the valve opening (not shown) in the cylinder wall (not shown). The provision of the two shoulders Q and R allows the reversal of the entire assembly with respect to the valve opening.

The valve described above has many advantages principal among which are cheapness and its long life due to lack of concentrated wear on the moving parts. The tubes C are continually changing the part in contact with the seats D due to holding the tubes in place with non-rigid fastenings. This constant shifting of the wearing surface of the tubes prevents the cutting or wearing of a groove in the tubes and the life of the valve is thereby prolonged.

I claim:

1. A valve, comprising in combination, a valve seat having ports, a plurality of movable tubes cooperating with the ports and adapted to be lifted therefrom by pressure fluid.

2. A valve comprising in combination, a valve seat, having a plurality of ports therein, a plurality of tubes adapted to be moved by pressure fluid cooperating with said ports, resilient means to hold said tubes normally on said ports, and a stop member for limiting the lift of said tubes.

3. A valve comprising in combination, a valve seat, having a plurality of ports therein, a plurality of cylindrical tubes cooperating with said ports and adapted to be lifted from said ports by pressure fluid, resilient means comprising springs for normally holding each of said tubes on a port, and a stop member for limiting the lift of said tubes.

4. A valve comprising in combination, a valve seat, having a plurality of straight ports therein, a plurality of cylindrical tubes cooperating with said ports and rotatable with respect thereto, resilient means comprising a pair of springs for normally holding each of said tubes in a slot, said springs having a coiled portion, one end of said spring being secured in said valve seat, the other end extending into the tubes, and a stop member for limiting the movement of said tubes.

In testimony whereof I have signed this specification.

ARTHUR J. BRIGGS.